(No Model.)
W. LOUDEN.
HAY STACKER.
No. 282,003. Patented July 24, 1883.
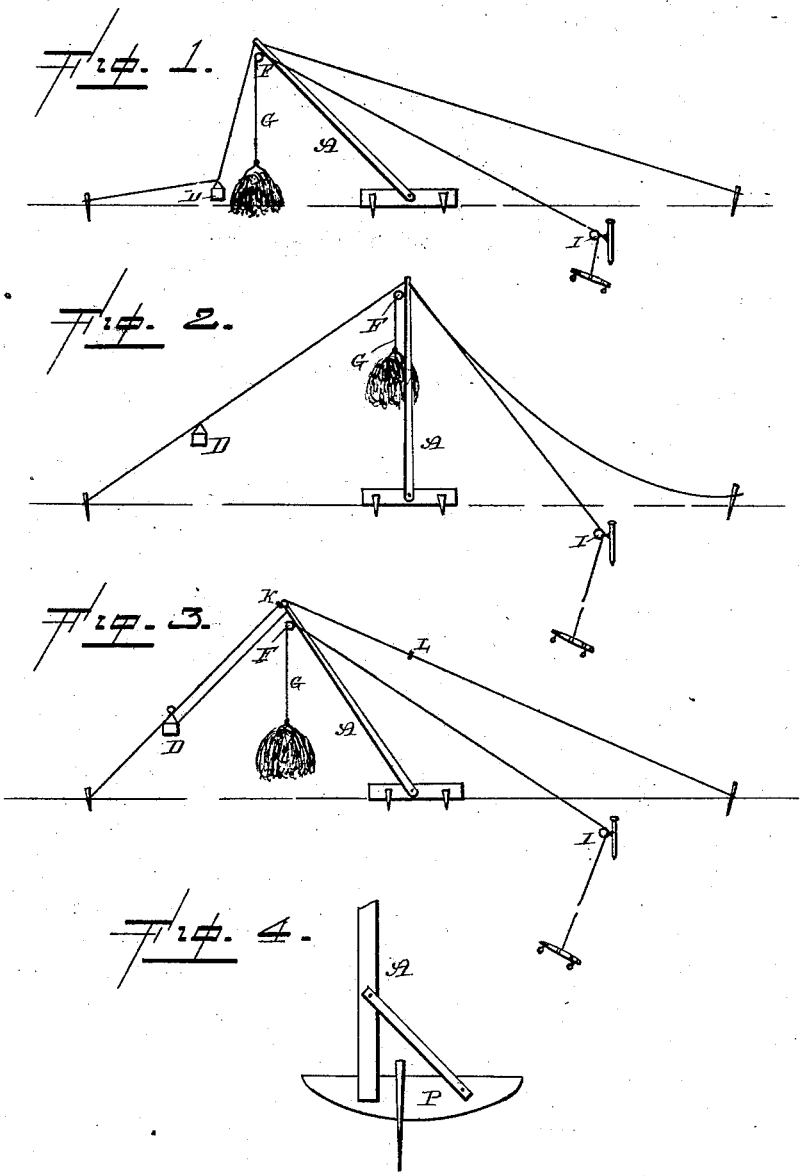
Witnesses.
Louis F. Gardner
J. W. Garner
Inventor.
Wm. Louden
per
J. A. Lehmann,
Atty.

UNITED STATES PATENT OFFICE.

WILLIAM LOUDEN, OF FAIRFIELD, IOWA.

HAY-STACKER.

SPECIFICATION forming part of Letters Patent No. 282,003, dated July 24, 1883.

Application filed March 22, 1883. (No model.)

*To all whom it may concern:*

Be it known that I, WILLIAM LOUDEN, of Fairfield, in the county of Jefferson and State of Iowa, have invented certain new and useful Improvements in an Apparatus for Stacking Hay; and I do hereby declare the following to be a full, clear, and exact description of the invention, such as will enable others skilled in the art to which it pertains to make and use it, reference being had to the accompanying drawings, which form part of this specification.

My invention relates to an improvement in apparatus for stacking hay; and it consists in the combination of a suitable derrick-pole provided with a pulley at its upper end, suitable guy-ropes, and a weight for drawing the pole back to an inclined position after it has been raised into a vertical or nearly vertical one by the horse, as will be more fully described hereinafter.

The object of my invention is to provide a cheap and simple apparatus by means of which hay can be raised upon a fork and dropped in a stack at any desired point.

Figures 1 and 2 are side elevations of my invention in different positions, and Figs. 3 and 4 are modifications of the same.

A represents a pole of any desired length, which may either be placed directly upon the ground or upon a base which is provided especially for it. This pole is intended to move back and forth at its upper end through any desired portion of a circle, according to the length of the stack which is being formed, or the distance it is desired to move the hay for the purpose of forming the stack. This pole is supported in position by any suitable number of guy-ropes, one of which is left quite slack, and is provided with a suitable weight, D, for the purpose of drawing the pole, when it is free to move, over toward it. When the pole is drawn upward into a vertical position, this rope is more or less tightened, as shown; but as soon as the pole is left free to move, it drops over in that direction and slackens up the rope again. At or near the top of this pole is loosely attached a guiding-pulley, F, over which the fork-rope G is passed. The outer end of the rope passes around a guiding-pulley, I, and is then attached to the horse. The horse having been backed to the pulley I, the fork is lowered upon the hay, to be loaded. When the horse is started up, this fork is raised vertically upward until the stop or fork reaches the guiding-pulley at the top of the pole, and then the upward movement of the fork stops; but the forward movement of the horse is then imparted to the pole, which moves along toward or over the stack which is being formed to any desired distance. The fork being tripped, its load of hay is deposited upon the stack. As the horse is then backed toward the guiding-pulley I, the weight draws the upper end of the pole over toward the point from which it started.

If so desired, the weight will be attached by a separate cord to the upper end of the pole, and the weight, which is provided with a pulley, will then slide upon the guy-rope. This guy-rope will be made in a single piece, and the upper end of the pole will be provided with a guiding-pulley for the guy-rope to pass over. The guy-rope will be provided with two stops, K and L, and the upper end of the pole will then have a movement of only from one stop to the other. The weight D serves to pull the upper end of the pole back into position after the pole has been moved.

The weight can be entirely dispensed with, if desired, in which case the pole will be made to slant more, and raised only to a perpendicular, beyond which it cannot pass on account of striking against a stop attached to the guy-rope.

As shown in Fig. 4, the lower end of the pole may be attached to a foot-piece, P, so that the pole will be made to rock, like a cradle, and set it so as to return the pole back when it is several feet past the perpendicular.

I do not limit myself to any particular method or manner of operating the pole, as the main part of the invention consists in supporting the pole and pulley by means of a guy-rope, and then giving the upper end of the pole more or less movement, so as to cause it to swing the loaded fork from one point to another.

Having thus described my invention, I claim—

1. The combination of the stacking-pole with suitable guy-ropes, by means of which it is supported in position, the upper end of the pole being made to move back and forth, for the purpose of carrying the loaded fork over the stack, substantially as shown.

2. The combination of the pole provided with a pulley at its upper end, suitable guy-ropes, and a weight which is attached to one of the ropes, for the purpose of drawing the pole back into position after it has been moved, so as to swing the fork over the stack, substantially as set forth.

In testimony whereof I affix my signature in presence of two witnesses.

WILLIAM LOUDEN.

Witnesses:
R. B. LOUDEN,
ANDREW LOUDEN, Jr.